US012237576B2

(12) United States Patent
Glatre et al.

(10) Patent No.: US 12,237,576 B2
(45) Date of Patent: Feb. 25, 2025

(54) SINGLE-PIECE CORRUGATED COMPONENT OF AN ANTENNA AND METHOD OF MANUFACTURE THEREOF

(71) Applicant: MacDonald, Dettwiler and Associates Corporation, Ste-Anne-de-Bellevue (CA)

(72) Inventors: Karim Glatre, Montréal (CA); Stéphane Lamoureux, Mirabel (CA); Alpha Ross, Cornwall (CA); Benoit Colson, Montréal (CA)

(73) Assignee: MACDONALD, DETTWILER AND ASSOCIATES CORPORATION, Ste-Anne-de-Bellevue (CA)

( * ) Notice: Subject to any disclaimer, the term of this patent is extended or adjusted under 35 U.S.C. 154(b) by 182 days.

(21) Appl. No.: 18/136,820

(22) Filed: Apr. 19, 2023

(65) Prior Publication Data

US 2023/0253714 A1 Aug. 10, 2023

Related U.S. Application Data

(63) Continuation-in-part of application No. 17/371,210, filed on Jul. 9, 2021, now abandoned.

(60) Provisional application No. 63/049,687, filed on Jul. 9, 2020.

(51) Int. Cl.
*H01Q 13/02* (2006.01)

(52) U.S. Cl.
CPC ..... *H01Q 13/0225* (2013.01); *H01Q 13/0291* (2013.01)

(58) Field of Classification Search
None
See application file for complete search history.

(56) References Cited

U.S. PATENT DOCUMENTS

| | | | | |
|---|---|---|---|---|
| 4,788,554 A * | 11/1988 | Smith | H01Q 13/0291 | 343/916 |
| 8,963,791 B1 * | 2/2015 | Edwards | H01Q 13/0216 | 343/781 R |
| 2004/0233119 A1 * | 11/2004 | Chandler | H01Q 13/0208 | 343/786 |
| 2005/0062663 A1 * | 3/2005 | Hills | H01Q 13/0216 | 343/781 CA |
| 2006/0125706 A1 * | 6/2006 | Amyotte | H01Q 13/0208 | 343/786 |

(Continued)

*Primary Examiner* — Dameon E Levi
*Assistant Examiner* — Anh N Ho
(74) *Attorney, Agent, or Firm* — PRAXIS

(57) ABSTRACT

A single-piece corrugated component, such as a feed horn, of an antenna includes a main body having a generally hollowed truncated pyramidal or conical shape which defines a body axis. The body extends from a base to an aperture, and includes a plurality of corrugations centered about the body axis, respectively. Each corrugation has a frustopyramidal ridge extending inwardly and locally perpendicularly from an inner surface of the main body at a ridge angle relative to the body axis varying between 10-60 degrees in a direction either toward the first end or the second end. A plurality of the frustopyramidal ridges have a respective inward virtual extension thereof crossing the body axis before intersecting the main body. A method of manufacturing the corrugated component includes the step of printing the component using an additive manufacturing technology.

14 Claims, 5 Drawing Sheets

(56) References Cited

U.S. PATENT DOCUMENTS

2012/0319910 A1* 12/2012 Gimersky ............ H01Q 19/132
343/786

* cited by examiner

SINGLE-PIECE CORRUGATED COMPONENT OF AN ANTENNA AND METHOD OF MANUFACTURE THEREOF

CROSS REFERENCE TO RELATED APPLICATIONS

This application is a Continuation-In-Part of U.S. patent application Ser. No. 17/371,210 filed on Jul. 9, 2021, which claims priority of U.S. Provisional Application for Patent No. 63/049,687 filed Jul. 9, 2020, the content of both applications is incorporated herein by reference in their entirety.

FIELD OF THE INVENTION

The present invention relates to the field of antennas, and is more particularly concerned with a corrugated component for use in antennas on board of spacecrafts and the like, such as a feed horn, a waveguide, etc., and a method of manufacture thereof.

BACKGROUND OF THE INVENTION

It is well known in the art of spacecraft antennas to use corrugated antenna components such as corrugated feed horns. In order to significantly improve the antenna electrical RF (Radio Frequency) performance (by reducing the RF losses), such corrugated horns 110, 110', as schematically illustrated in FIGS. 1-2, typically include a plurality of corrugations 120 formed with respective ridges 124 define annular grooved channels adjacent one another. As the dimensions (depth and width) of each one of these ridges 124 need to be relatively accurate to ensure the RF electrical performance of the horn, each ridge 124 need to be machined using precise CNC (computer numerical control) machining. For horn 110 having a relatively small flare angle F, as illustrated in FIGS. 1A and 1B, the machining of the ridges 124 from the main structure 112 is typically limited to ridges 124 being generally oriented perpendicular (see dotted line 125) to the axis 114 of the horn 110. Also, in few occasions where the flare angle F' of the conical horn structure 112' is wide enough (usually more than 45 degrees relative to the horn axis 114), as shown in FIG. 2 (FIGS. 2A and 2B), the absence of physical obstructions make it possible to accurately machine the all ridges 124, via the horn aperture 118, with an orientation perpendicular to the conical structure 112' of the horn 110'.

Corrugated horns with machined corrugations typically suffer from having many drawbacks, especially in aerospace applications where low mass, extreme environmental physical constraints, and high cost, etc. are non-negligible aspects to be considered. For example, CNC machining is time consuming and expensive. Structural integrity of the horns (mainly with low flare angles) requires additional external ribs for bracket attachments or relatively thick walls (for structural integrity), which is non-desirable additional mass.

Similar considerations are also applicable to other corrugated antenna components, such as waveguides, etc.

Accordingly, there is a need for an improved corrugated component for use in antennas on board of spacecrafts and the like, and a method of its manufacture.

SUMMARY OF THE INVENTION

It is therefore a general object of the present invention to provide an improved corrugated component to obviate the above-mentioned problems, and a method of its manufacture.

An advantage of the present invention is that the single-piece corrugated antenna component can be manufactured by any applicable additive manufacturing technology, or 3D printing. This manufacturing process enables the manufacturing of several components/horns at the same time, as well as the simultaneous inclusion of the ribs and/or mechanical brackets, when applicable. Other parts of the antenna could also be manufactured out of the same single-piece, such at the base/input of the horn towards the rest of the antenna feed. All the above reducing the manufacturing time and cost, as well as up to about 50% of the overall mass of each horn.

Another advantage of the present invention is that the single-piece corrugated component can be manufactured from one way (as from base to aperture for a horn) or the other (as from aperture to base for a horn), and the corrugations could be angled in either direction relative to the component/horn main axis (i.e. toward the aperture or the base for a horn).

A further advantage of the present invention is that the structural performance of the corrugated component is optimal, i.e. the 3D printed supports are thickness, profile, and position tuned to minimize stress concentrations, eliminate internal parts, bolted and bonded interfaces; and meet thermoelastic (flexible), stiffness (eigen and buckling), and strength (static and dynamic) requirements for the space (LEO, MEO, and GEO-Low, Medium and Geostationary Earth Orbit) and launch environments.

Still another advantage of the present invention is that the time to design and analyze the horn is significantly reduced from the traditional design. This advantage also applies to adaptability of the design to variation of customer requirements including for example interface locations and RF requirements.

Yet another advantage of the present invention is that the structural supports of the horn occupy less volume than traditional design, thus permitting more payload to be mounted on the same spacecraft.

Yet a further advantage of the present invention is that the natural shape and orientation of the component corrugations (or the respective ridges), between a cone plus or minus ten (10) degrees and a cone plus or minus sixty (60) degrees with respect to the component axis, as required by the RF design, and not typically perpendicular to the wall of the component, provide a bellows type of structure, which is inheritably flexible and optimal to withstand on-orbit thermoelastic deformations. To complement the above-mentioned structural optimization, the rigidity and thickness of the component wall is locally tunable to provide the stiffness and strength needed to also withstand the launch environment, without compromising the flexibility advantage of the natural bellows shape. This local perpendicularity of the ridges relative to the side wall of the component (due to the step-like shape of the side wall with one step per corrugation) generates non-symmetrical channels between adjacent ridges since the sides surfaces of the channels have generally different lengths, which in turn advantageously affect the overall electrical performance of the component.

Still a further advantage of the present invention is that the corrugated component or horn can be printed with the rest of, or at least a portion of the feedchain (such as a circular waveguide to rectangular waveguide transition, an orthomode transducer (OMT), a diplexer, a filter, a polarizer, a coupler, or any other feeding network component, etc.) in one single piece which significantly reduces the assembly time and overall mass of the feedchain, which proves especially efficient in space applications.

According to an aspect of the present invention there is provided a single-piece corrugated component of an antenna comprising:

a main body having a generally hollowed truncated pyramidal or conical shape defining a body axis, the main body extending from a first end to a second end, the main body including a plurality of corrugations centered about the body axis, respectively, each said corrugation having a frustopyramidal ridge adjacent a respective channel and defining side surfaces thereof;

wherein a plurality of the frustopyramidal ridges being oriented to have a respective inward virtual extension thereof crossing the body axis and intersecting the main body; and wherein the side surfaces of each said frustopyramidal ridge extending inwardly and locally perpendicularly from an inner surface of the main body at an angle relative to the body axis varying between about ten and about sixty degrees (10°-60°) in a direction either toward the first end or the second end.

In one embodiment, the ridge of each said corrugation extends inwardly in a direction toward the first end.

In one embodiment, the ridge of each said corrugation extends inwardly in a direction toward the second end.

In one embodiment, the first end is a base and the second end is an aperture, the main body flaring out from the base toward the aperture at a flare angle being less than 45 degrees (<45°) relative to the body axis.

In one embodiment, an attachment bracket extends outwardly from the main body.

In one embodiment, at least one of a circular waveguide to rectangular waveguide transition, an orthomode transducer, a diplexer, a filter, a polarizer, a coupler, and another feeding network component extends outwardly from the main body adjacent the first end.

In one embodiment, the main body has a generally hollowed frustoconical shape, and conveniently a generally hollowed cylindrical shape or a generally hollowed frustopyramidal shape, or a generally hollowed prismatic shape.

In one embodiment, the main body has a first section having a generally hollowed frustoconical shape and a second section having a generally hollowed frustopyramidal shape.

In one embodiment, the body axis is generally rectilinear, and conveniently, the first end and the second end are generally parallel to one another.

In one embodiment, the body axis is generally curvilinear.

According to another aspect of the present invention there is provided a method for manufacturing a single-piece corrugated component as detailed hereinabove comprising the step of printing said corrugated component using an additive manufacturing (or 3D printing) technology.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

With reference to the annexed drawings the preferred embodiment of the present invention will be herein described for indicative purpose and by no means as of limitation.

Figures 1A, 1B, 2A, 2B:
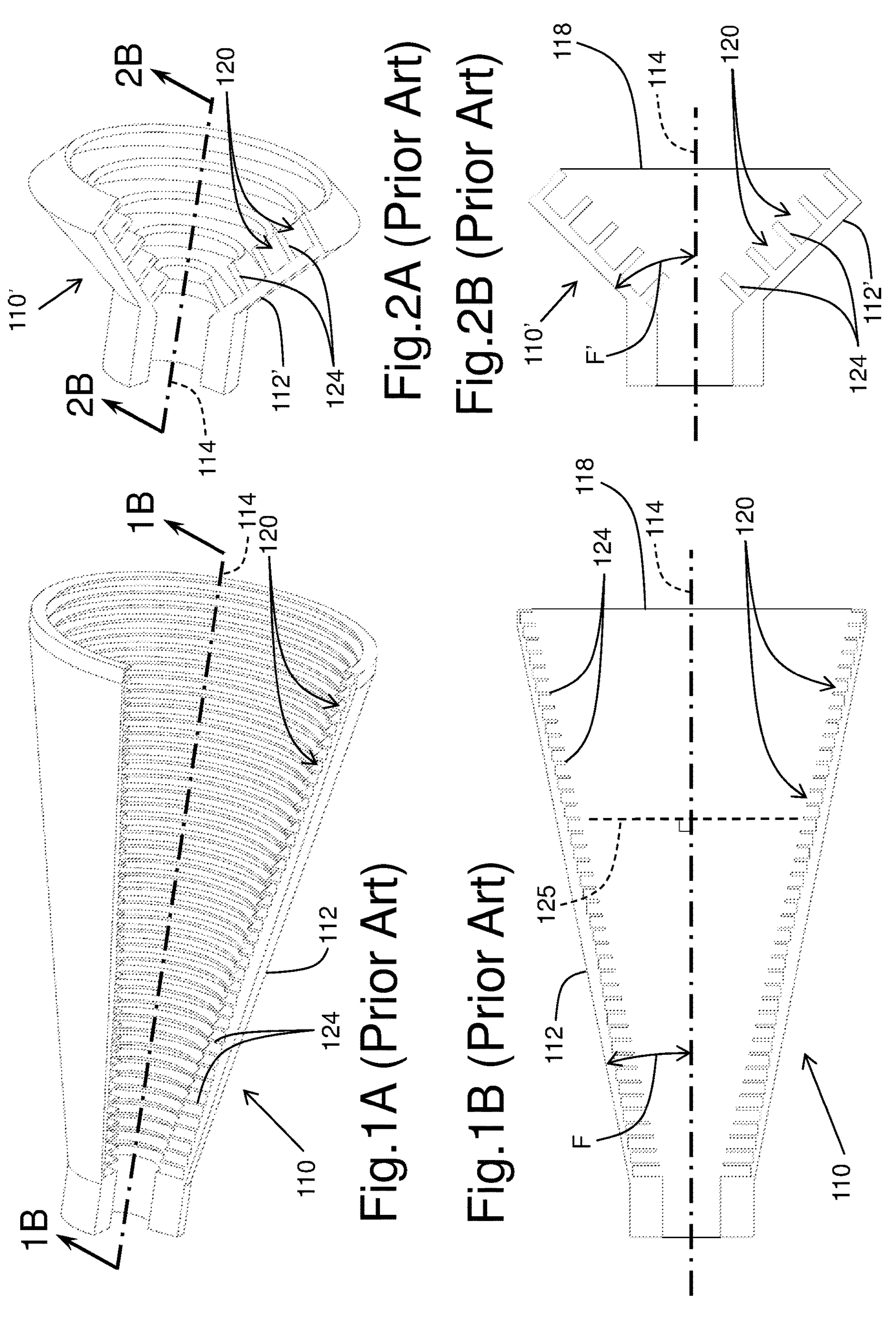
Fig.1A (Prior Art)
Fig.1B (Prior Art)
Fig.2A (Prior Art)
Fig.2B (Prior Art)
FIGS. 1A and 1B are partially broken side perspective view and schematic section view taken along line 1B-1B of FIG. 1A, respectively, of an antenna corrugated component, or feed horn of the prior art having a relatively small flare angle with machined circular corrugations perpendicular to the body axis of the horn.
FIGS. 2A and 2B are partially broken side perspective view and schematic section view taken along line 2B-2B of FIG. 2A, B, respectively, showing another corrugated feed horn of the prior art having a relatively large flare angle with machined frustoconical corrugations perpendicular to the flare direction of the horn.
Figures 3, 4, 4A, 5:
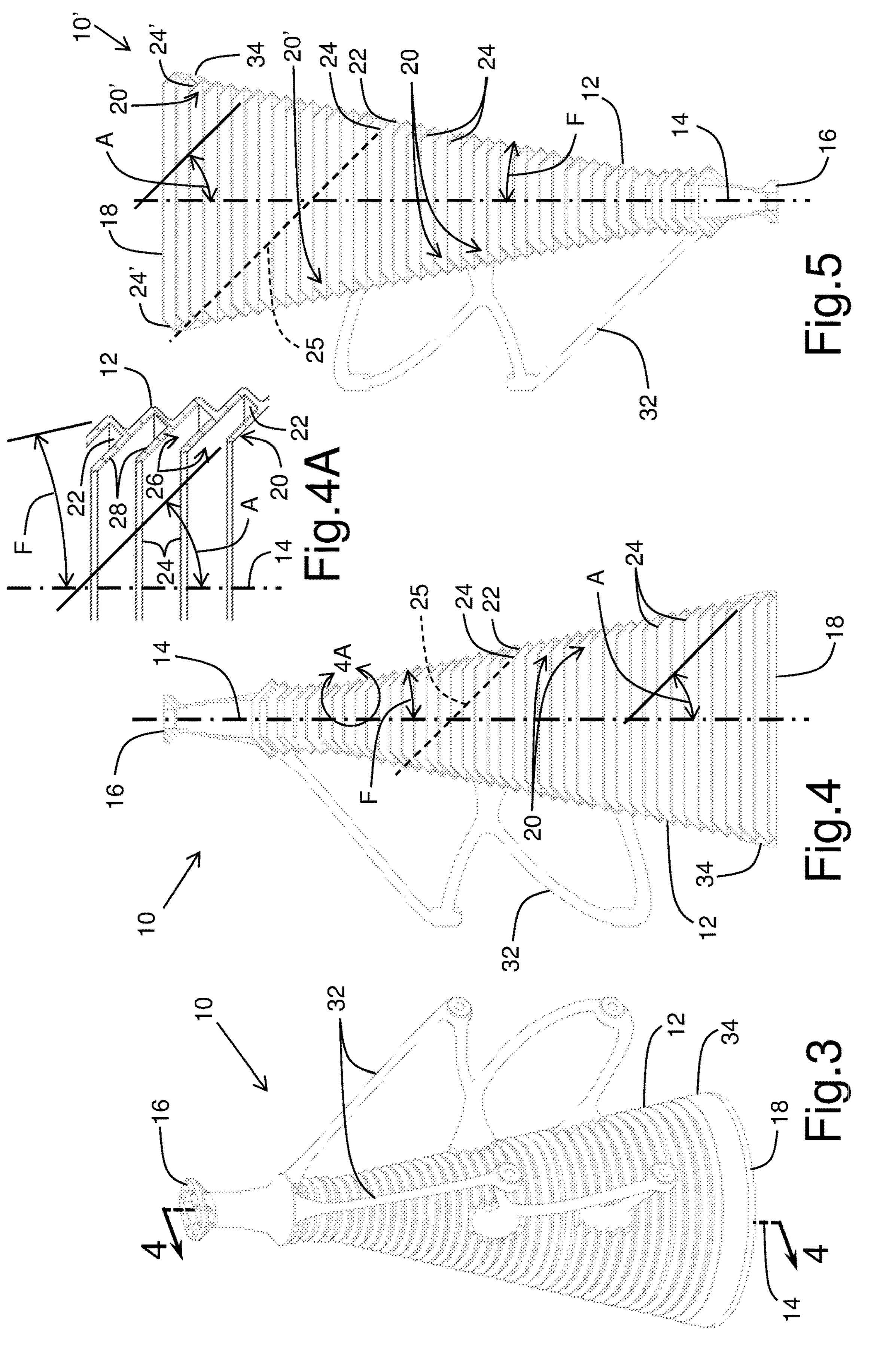
FIG. 3 is a perspective view of a single-piece corrugated component, more specifically a feed horn with a frustoconical shape, in accordance with an embodiment of the present invention, showing some ribs and brackets printed along with the conical horn.
FIG. 4 is a schematic partially broken section view taken along line 4-4 of FIG. 3, showing the frustoconical corrugations oriented at about 45 degrees relative to the body axis and in a direction toward the aperture.
FIG. 4A is an enlarged broken section view taken along line 4A of FIG. 4, showing details of the frustoconical ridges of the corrugations extending inwardly from the side wall of the single-piece corrugated component.
FIG. 5 is a view similar to FIG. 4 of another embodiment of a single-piece corrugated feed horn in accordance with the present invention, showing the frustoconical corrugations oriented at about 45 degrees relative to the body axis and in a direction toward the base.

Referring to FIGS. 3 and 4, there is shown a single-piece corrugated antenna feed component, more specifically a feed horn being illustrated, in accordance with an embodiment 10 of the present invention, typically for use in antennas onboard of spacecraft (not shown) or the like to transmit (Tx) and/or receive (Rx) an RF (radio-frequency) electromagnetic signal of a predetermined signal frequency band.

The single-piece corrugated horn 10 is preferably manufactured using a 3D (three dimensional) printer and includes a main body 12 having a generally hollowed frustopyramidal (frustoconical for a circular component) shape which defines a body axis 14. The main body 12 extends from a first end 16 toward a second end 18. As better seen in FIG. 4, the main body 12 includes a plurality of corrugations 20 centered about the body axis 14, respectively, and protruding inwardly from an inner surface 22 of the main body 12 and locally perpendicularly to the inner surface 22 (although not perpendicular to the overall side wall of the body 12). The term 'locally' essentially means 'at each respective corrugation 20' by referring to the fact that the overall main body 12 is a side wall having a plurality of steps, one per corrugation 20, formed therein, as best seen in FIG. 4A. Each corrugation 20 is a frustopyramidal (frustoconical for a circular component) ridge 24, adjacent a respective channel 26, with side surfaces 28 thereof that extends inwardly of the main body 12 at a ridge angle A relative to the body axis 14 typically varying between about ten (10) and about sixty (60) degrees, and preferably about forty-five (45) degrees, and on either direction i.e. toward the first end 16 or toward the second end 18, as to provide for a flexible and optimal bellows type of structure. Hence, the overall side wall of the main body 12 is generally angled relative to the component axis 14 with the flare angle F, while the inner surface 22 of the side wall at each ridge 24 is oriented locally perpendicularly to the ridge 24. Furthermore, each channel 26, of a generally rectangular U-shape defined by the side surfaces 28 of two adjacent ridges 24 and the respective inner surface 22, typically has its side surfaces 28 of significantly different lengths relative to each other. Typically, an attachment bracket 32 could extend outwardly from the main body 12 to allow for the securing of the horn 10 to an adjacent supporting structure (not shown).

The term 'frustopyramidal' (or 'frustoprismatic'), in the present description, includes the term 'frustoconical' that is a specific case in which the truncated pyramid has an infinite number of side surfaces to form a truncated cone.

Figure 12:
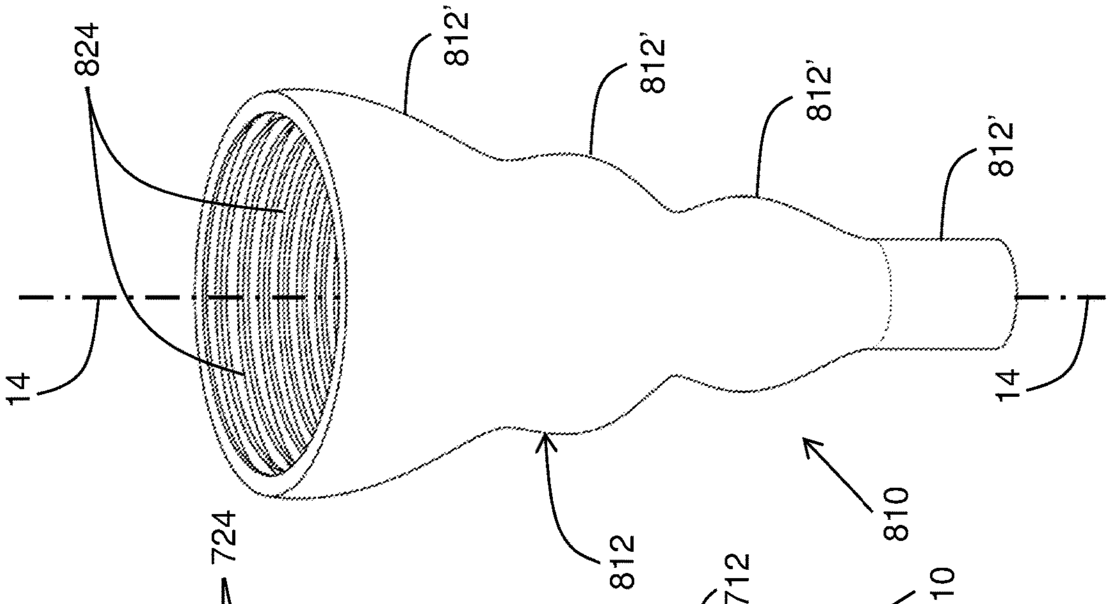
FIG. 12 is a view similar to FIG. 3 of another embodiment of a single-piece corrugated component in accordance with the present invention, showing a feed horn with different successive sections (of conical shapes) having different flare angles.

In the case of the antenna component being a horn, as illustrated in FIGS. 3, 4 and 4A, the main body 12 typically flares out from the first end or base 16 toward the second end or aperture 18, at a flare angle F being less than 45 degrees (<45°), and typically varying between about 20 degrees to about 35 degrees (20°-35°) relative to the body or horn axis 14. Although the flare angle F is shown as being constant (rectilinear tapering), it could be variable for different sections of the main body 12 and non-uniform along the body axis 14 (as illustrated in FIG. 12).

The term 'frustopyramidal', in the present description, also includes the term 'prismatic' that is another specific case in which the truncated pyramid has essentially a zero-degree (0°) flare angle F, such that the side surfaces of the truncated pyramid are essentially parallel to the body axis 14. Similarly, when the 'prismatic', in the present description, includes the term 'cylindrical' that is a specific case in which the prism has an infinite number of side surfaces to form a cylinder.

In the embodiment 10 shown in FIGS. 3 and 4, each corrugation 20 or ridge 24 tapers, or is oriented in the direction towards the base 16.

Alternatively, the embodiment 10' illustrated in FIG. 5 has the corrugations 20 or ridges 24 tapering in the direction of the aperture 18.

In both embodiments 10, 10', but more specifically the embodiment of FIG. 5, most of each ridge 24 is oriented in such a way that its inward virtual extension 25, shown in stippled lines, crosses the horn axis 14 and intersects the main body 12 of the horn 10. This axis-crossing characteristic specifically prevents the horn 10 from being easily machined with conventional high precision CNC machines at reasonable cost. Only the first few corrugations 20' or ridges 24' adjacent the aperture 18 in the embodiment of FIG. 5 do not have this characteristic.

For structural integrity of the component/horn 10, or other considerations, some sections of the main body 12 can include ribs 34 or the like.

Figure 7:
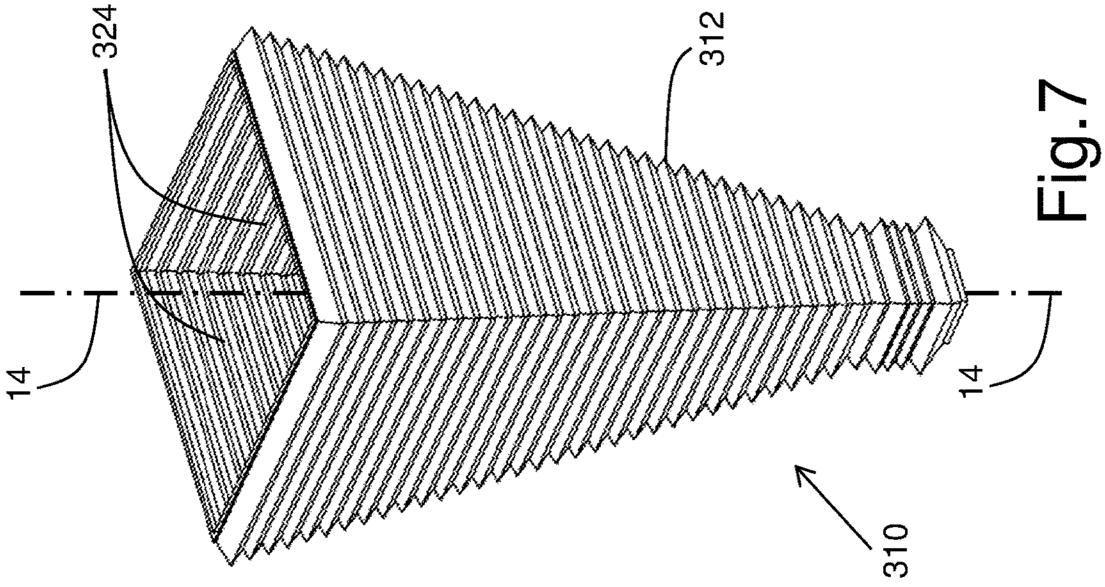
FIG. 7 is a view similar to FIG. 3 of another embodiment of a single-piece corrugated component in accordance with the present invention, showing a feed horn with a square prismatic shape.
Figure 6:
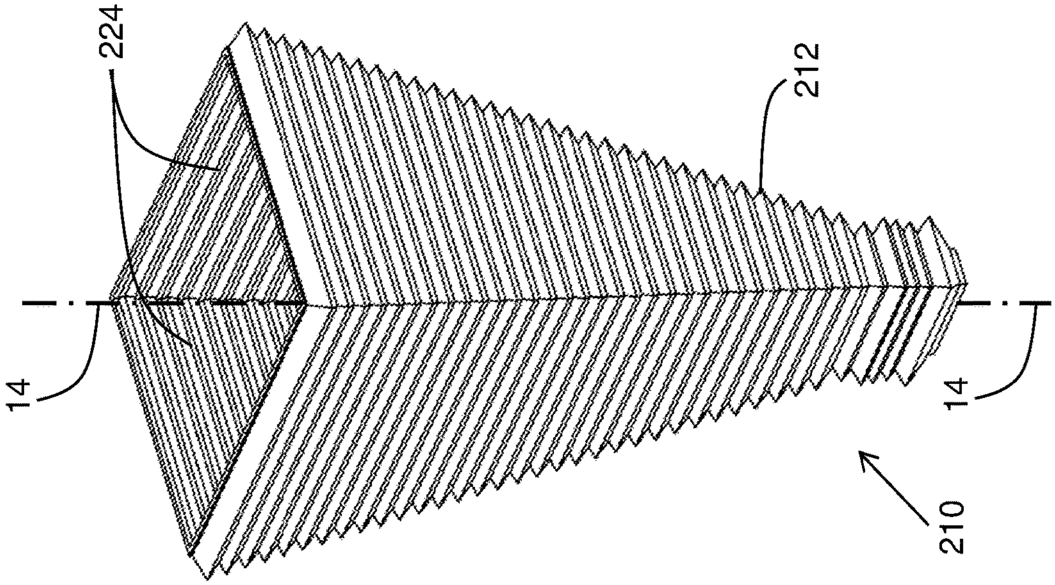
FIG. 6 is a view similar to FIG. 3 of another embodiment of a single-piece corrugated component in accordance with the present invention, showing a feed horn with a rectangular prismatic shape.

Without departing from the scope of the present invention, one skilled in the art would readily understand that multiple shapes of the main body 12 could be considered, as well as different combination(s) thereof. As non-limiting examples, FIGS. 6 and 7 respectively show other embodiments 210, 310 of single-piece corrugated feed horn components having main bodies 212, 312 of rectangular and square frustoprismatic (the term 'frusto' referring to a truncated taper or flare) shapes, with corresponding rectangular and square frustopyramidal ridges 224, 324.

Figure 8:
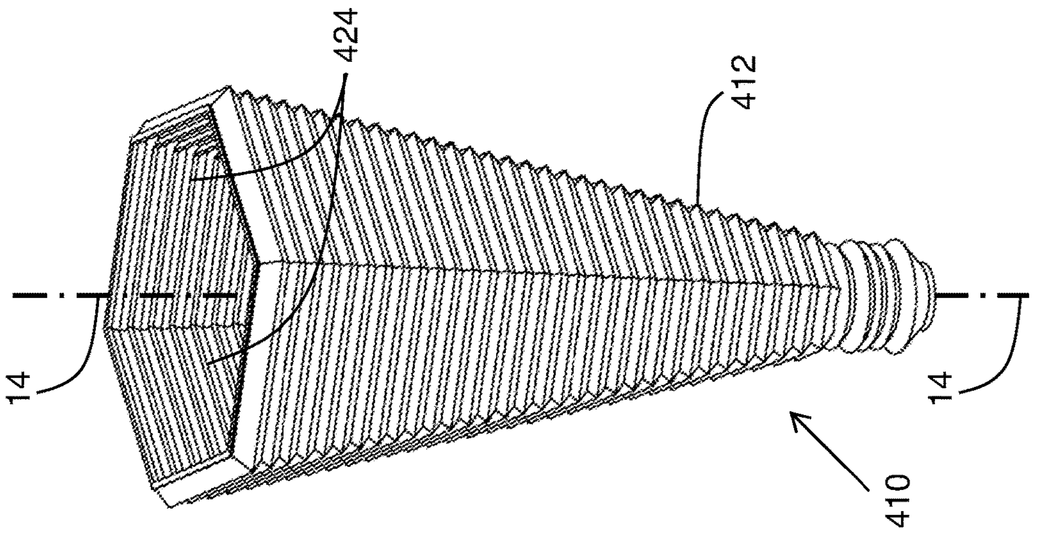
FIG. 8 is a view similar to FIG. 3 of another embodiment of a single-piece corrugated component in accordance with the present invention, showing a feed horn with a hexagonal prismatic shape.

Similarly, FIG. 8 shows another embodiment 410 of a single-piece corrugated feed horn component having a main body 412 of a hexagonal prismatic shape, with hexagonal frustopyramidal ridges 424.

Figure 9:
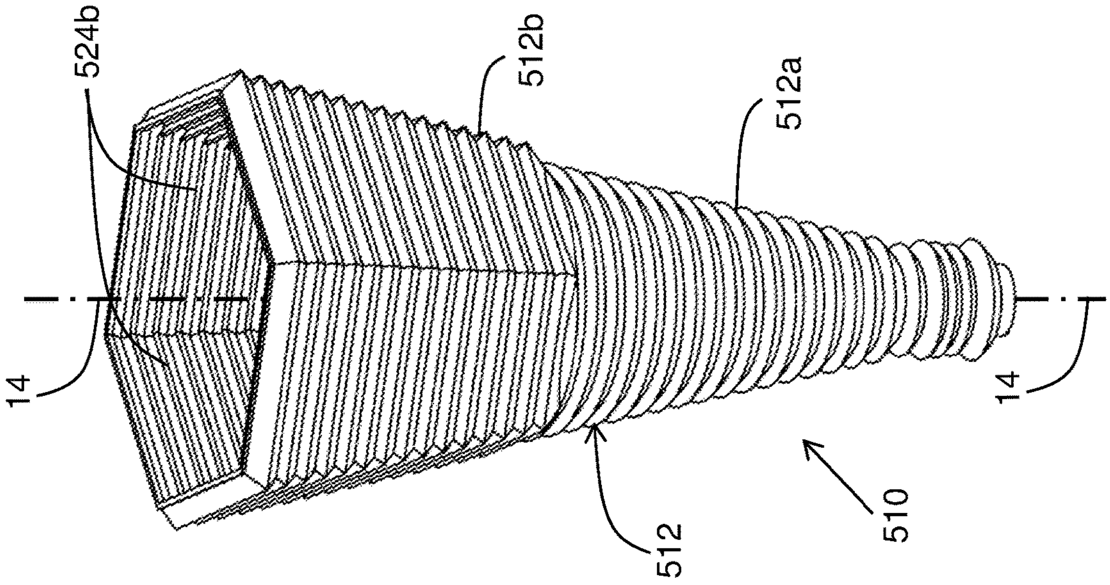
FIG. 9 is a view similar to FIG. 3 of another embodiment of a single-piece corrugated component in accordance with the present invention, showing a feed horn with a first section having a conical shape and a second section having hexagonal prismatic shape.

FIG. 9 shows another embodiment 510 of a single-piece corrugated feed horn component having first **512*a* and second 512*b* sections of the main body 512 of circular frustoconical and hexagonal frustoprismatic shapes, respectively, with corresponding circular frustoconical (not shown) and hexagonal frustopyramidal 524*b*** ridges.

Figure 10:
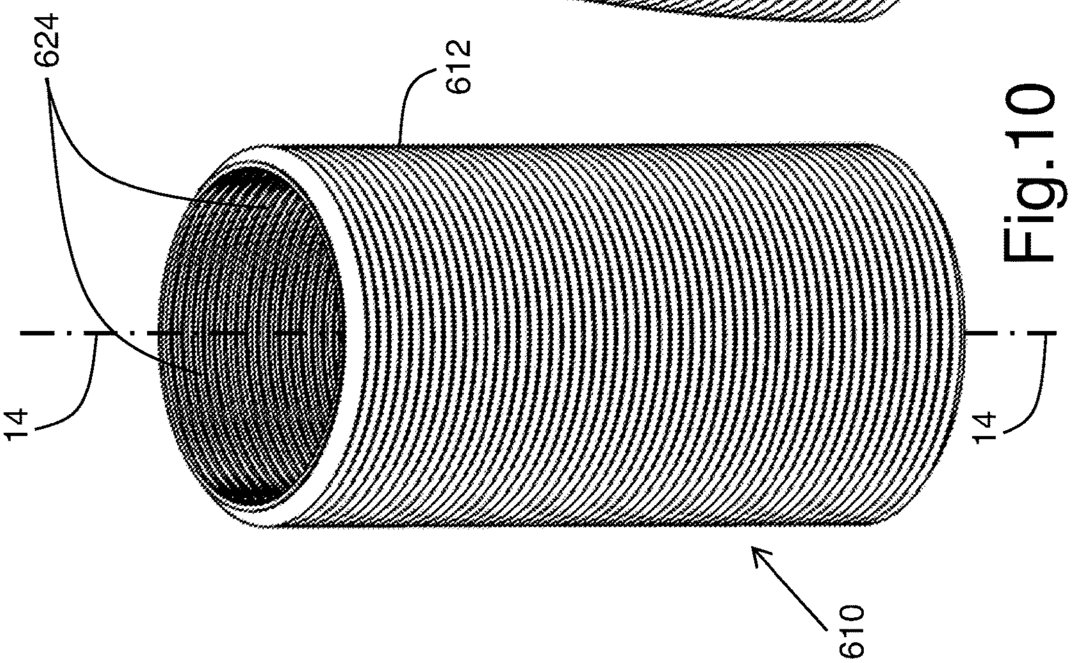
FIG. 10 is a view similar to FIG. 3 of another embodiment of a single-piece corrugated component in accordance with the present invention, showing a waveguide with a cylindrical shape with a rectilinear (or straight) body axis.
Figure 11:
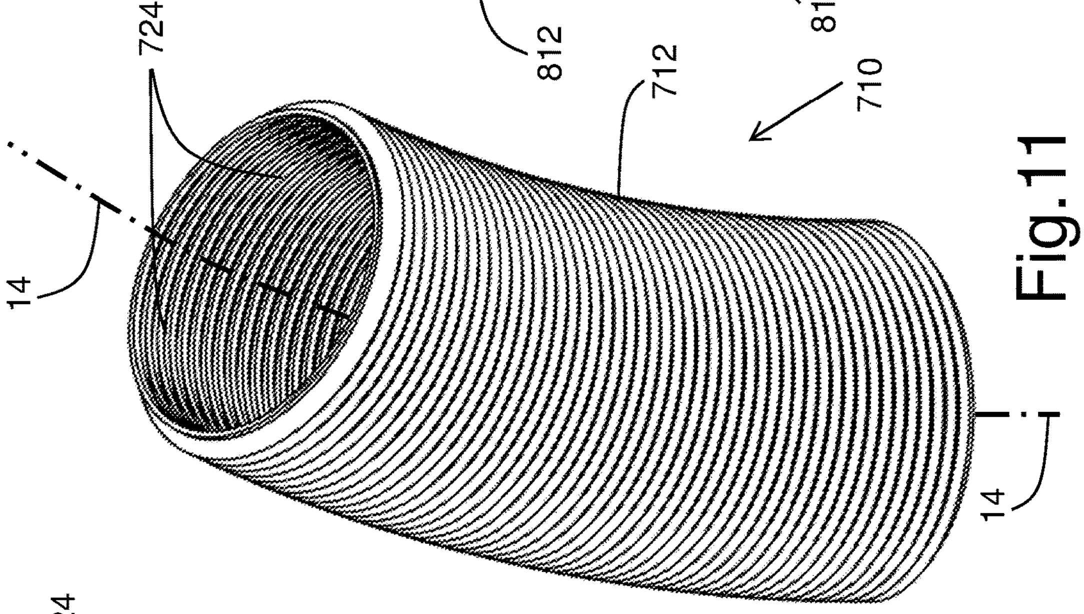
FIG. 11 is a view similar to FIG. 10 of another embodiment of a single-piece corrugated component in accordance with the present invention, showing a waveguide with a cylindrical shape and a curvilinear (or curved or bent) body axis.

Alternatively, FIGS. 10 and 11 respectively show other embodiments 610, 710 of single-piece corrugated waveguide components having main bodies 612, 712 of cylindrical shapes (or circular frustoconical shapes with essentially zero degree (0°) of flare angle F), with circular frustoconical ridges 624, 724 along rectilinear (or straight) and curvilinear (or curved or bent) body axes 14, respectively. Although illustrated here with a circular waveguide component, any component could have a curvilinear body axis 14.

As illustrated in FIGS. 3 to 10 and 12, the body axis 14 is generally rectilinear (or straight), and as illustrated in FIG. 11, the body axis 14 is generally curvilinear (or curved or bent). When the body axis 14 is rectilinear, the first end 16 and the second end 18 are generally parallel to one another, although they could not be, if required for the specific needs.

FIG. 12 shows another embodiment 810 of a single-piece corrugated feed horn in which the flare angle (F) is different for different and successive sections 812' of the main body 812, or could also be continuously varying within a section 812' (as a generally splined circular frustoconical shape of the main body 812). Similarly, although not visible from the figure, the circular frustoconical ridges 824 could have different orientations for the different sections 812' of the main body 812.

The present invention also includes a method for manufacturing any one of the above embodiments 10, 10', 210, 310, 410, 510, 610, 710, 810 comprising the step of printing the corrugated antenna component using an applicable additive manufacturing (or 3D printing) technology. The embodiments 10, 10', 210, 310, 410, 510, 610, 710, 810 are typically manufactured, or printed from the second end or aperture 18 toward the first end or base 16, or the other way around, from the base 16 toward the aperture 18, respectively.

Also, one skilled in the art would readily realize that, without departing from the scope of the present invention, the method of 3D printing, or additive manufacturing, of the horn 10, 10', 210, 310, 410, 510, 610, 710, 810 allows for other section(s) of the antenna feed, such as a circular waveguide to rectangular waveguide transition, an orthomode transducer, a diplexer, a filter, a polarizer, a coupler, or any other feeding network component (as waveguides of FIGS. 10 and 11), etc., to be simultaneously manufactured in the same piece, typically adjacent the first end or base 16.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinabove described and hereinafter claimed.

We claim:

1. A single-piece corrugated component of an antenna comprising:

a main body having a generally hollowed truncated pyramidal or conical shape defining a body axis, the main body extending from a first end to a second end, the main body including a plurality of corrugations centered about the body axis, respectively, each said plurality of corrugations having a frustopyramidal ridge adjacent a respective channel and defining side surfaces thereof;

wherein each said frustopyramidal ridge having a respective inward virtual extension thereof crossing the body axis before intersecting the main body; and wherein the side surfaces of each said frustopyramidal ridge extending inwardly and locally perpendicularly from an inner surface of the main body at a ridge angle relative to the body axis varying between about ten and about sixty degrees (10°-60°) in a direction either toward the first end or the second end.

2. The single-piece corrugated component of claim 1, wherein the first end is a base and the second end is an aperture, the main body flaring out from the base toward the aperture at a flare angle being less than 45 degrees (<45°) relative to the body axis.

3. The single-piece corrugated component of claim 1, wherein said frustopyramidal ridge of each said corrugation extends inwardly in a direction toward the second end.

4. The single-piece corrugated component of claim 1, wherein said frustopyramidal ridge of each said corrugation extends inwardly in a direction toward the first end.

5. The single-piece corrugated component of claim 2, wherein an attachment bracket extends outwardly from the main body.

6. The single-piece corrugated component of claim 1, wherein the main body has a generally hollowed frustoconical shape.

7. The single-piece corrugated component of claim 1, wherein the main body has a generally hollowed cylindrical shape.

8. The single-piece corrugated component of claim 1, wherein the main body has a generally hollowed prismatic shape.

9. The single-piece corrugated component of claim 1, wherein the main body has a generally hollowed frustopyramidal shape.

10. The single-piece corrugated component of claim 1, wherein the main body has a first section having a generally hollowed frustoconical shape and a second section having a generally hollowed frustopyramidal shape.

11. The single-piece corrugated component of claim 1, wherein the body axis is generally rectilinear.

12. The single-piece corrugated component of claim 11, wherein the first end and the second end are generally parallel to one another.

13. The single-piece corrugated component of claim 1, wherein the body axis is generally curvilinear.

14. A method for manufacturing a single-piece corrugated component of an antenna including a main body having a generally hollowed truncated pyramidal or conical shape defining a body axis, the main body extending from a first end to a second end, the main body including a plurality of corrugations centered about the body axis, respectively, each said plurality of corrugations having a frustopyramidal ridge adjacent a respective channel and defining side surfaces thereof, wherein each said frustopyramidal ridge having a respective inward virtual extension thereof crossing the body axis before intersecting the main body, and wherein the side surfaces of each said frustopyramidal ridge extending inwardly and locally perpendicularly from an inner surface of the main body at a ridge angle relative to the body axis varying between about ten and about sixty degrees (10°-60°) in a direction either toward the first end or the second end, said method comprising the step of printing said single-piece corrugated component using an additive manufacturing technology.

* * * * *